United States Patent
Ghosh et al.

(10) Patent No.: US 10,171,493 B2
(45) Date of Patent: Jan. 1, 2019

(54) METHOD AND SYSTEM TO DYNAMICALLY OBFUSCATE A WEB SERVICES INTERFACE

(71) Applicant: Sears Brands, L.L.C., Hoffman Estates, IL (US)

(72) Inventors: Partha Ghosh, Pune (IN); Vivek Bawge, Magarpatta (IN)

(73) Assignee: Sears Brands, L.L.C., Hoffman Estates, IL (US)

( * ) Notice: Subject to any disclaimer, the term of this patent is extended or adjusted under 35 U.S.C. 154(b) by 185 days.

(21) Appl. No.: 15/205,298

(22) Filed: Jul. 8, 2016

(65) Prior Publication Data
US 2017/0257392 A1   Sep. 7, 2017

(30) Foreign Application Priority Data
Mar. 5, 2016   (IN) .............................. 201611007792

(51) Int. Cl.
G06F 21/00   (2013.01)
H04L 29/06   (2006.01)
H04L 29/08   (2006.01)

(52) U.S. Cl.
CPC .......... H04L 63/1458 (2013.01); H04L 67/02 (2013.01); H04L 67/141 (2013.01); H04L 67/42 (2013.01); *H04L 2463/102* (2013.01); *H04L 2463/121* (2013.01)

(58) Field of Classification Search
CPC .. G06F 21/31; G06F 21/10; G06F 2221/2137; H04L 63/0428; H04L 63/08; H04L 9/321; H04L 63/0884; H04L 63/04
See application file for complete search history.

(56) References Cited

U.S. PATENT DOCUMENTS

| | | |
|---|---|---|
| 6,668,325 B1 | 12/2003 | Collberg et al. |
| 7,207,062 B2 | 4/2007 | Brustoloni |
| 7,243,340 B2 | 7/2007 | Tobin |
| 7,337,148 B2 | 2/2008 | Xie et al. |
| 7,386,620 B2 | 6/2008 | Lei et al. |
| 7,464,081 B2 | 12/2008 | McKinley et al. |
| 7,529,833 B2 | 5/2009 | Cai et al. |
| 7,593,994 B2 | 9/2009 | Milligan et al. |
| 7,647,523 B2 | 1/2010 | Lindquist et al. |
| 7,822,840 B2 | 10/2010 | Chen et al. |
| 7,877,725 B2 | 1/2011 | Vitanov et al. |
| 7,934,252 B2 | 4/2011 | Chung et al. |
| 7,987,163 B2 | 7/2011 | Keshavarz-Nia et al. |
| 7,987,278 B2 | 7/2011 | Regnier |
| 8,019,884 B2 | 9/2011 | Manning et al. |
| 8,050,935 B2 | 11/2011 | Plutowski et al. |
| 8,055,935 B2 | 11/2011 | Chafle et al. |
| 8,060,586 B2 | 11/2011 | Yang et al. |
| 8,122,365 B2 | 2/2012 | Padmanabhuni et al. |
| 8,171,535 B2 | 5/2012 | Rubio et al. |
| 8,271,940 B2 | 9/2012 | Vitanov et al. |
| 8,326,856 B2 | 12/2012 | Zhang et al. |
| 8,346,929 B1 | 1/2013 | Lai |
| 8,365,298 B2 | 1/2013 | Kerschbaum et al. |
| 8,543,810 B1 | 9/2013 | Angal et al. |

(Continued)

*Primary Examiner* — Ghazal B Shehni

(57) ABSTRACT

The present application relates to the handling of what are generally referred to as denial of service (DoS) attacks. More specifically, the present application relates to a method and system for protecting one or more on-line Web service application servers from DoS and/or distributed DoS (DDoS) attacks.

24 Claims, 6 Drawing Sheets

(56) References Cited

U.S. PATENT DOCUMENTS

| | | |
|---|---|---|
| 8,640,149 B2 | 1/2014 | Liu et al. |
| 8,650,608 B2 | 2/2014 | Ono et al. |
| 8,935,743 B2 | 1/2015 | Sarferaz |
| 8,959,219 B2 | 2/2015 | Mercuri |
| 8,996,606 B2 | 3/2015 | Seaman, II et al. |
| 9,037,711 B2 | 5/2015 | Maida-Smith et al. |
| 9,064,109 B2 | 6/2015 | Smith et al. |
| 9,104,398 B2 | 8/2015 | Karimisetty et al. |
| 9,203,907 B2 | 12/2015 | Ma et al. |
| 2011/0072516 A1 | 3/2011 | Cohen et al. |

METHOD AND SYSTEM TO DYNAMICALLY OBFUSCATE A WEB SERVICES INTERFACE

CROSS-REFERENCE TO RELATED APPLICATIONS/INCORPORATION BY REFERENCE

The present patent application makes reference to, claims priority to, and claims benefit from Indian Provisional Patent Application No. 201611007792, filed on Mar. 5, 2016, and titled "Method and System to Dynamically Obfuscate a Web Services Interface," which is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various forms of denial of service (DoS) attacks are frequently used to interfere with or disable commercial Web sites used to provide consumer access to e-commerce services. The same techniques used in waging denial of service attacks on commercial e-commerce web sites used to provide consumer browser access to shopping web sites may also be used against the Internet accessible interfaces used to provide Web services. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
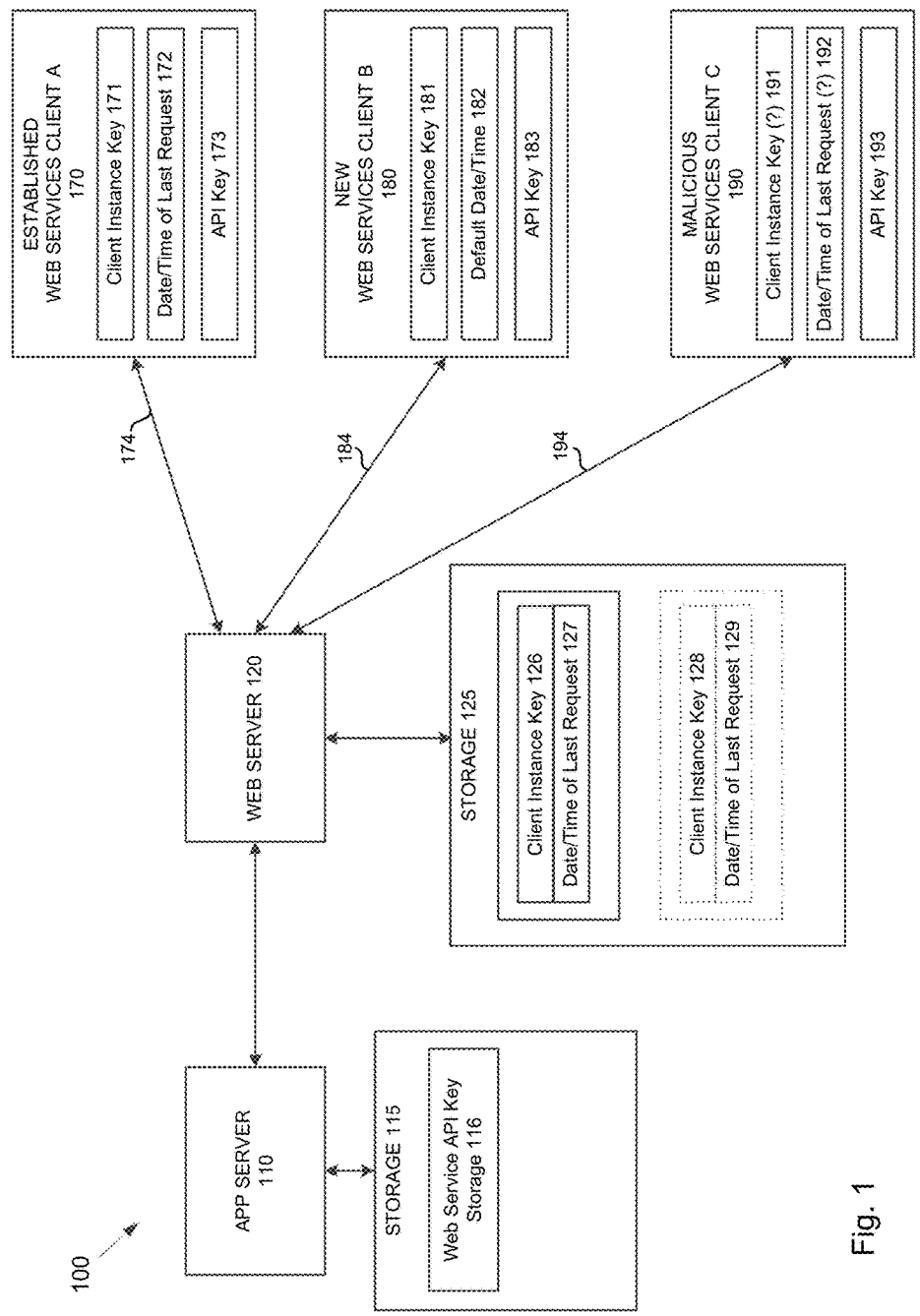
FIG. 1 is a block diagram illustrating the elements of an example network, in accordance with various aspects of the present disclosure.

Various aspects of this disclosure provide a method and system for protecting a Web services interface against denial of service attacks. As non-limiting examples, various aspects of this disclosure provide a method and system for protecting a Web services interface against denial of service attacks.

DETAILED DESCRIPTION OF VARIOUS ASPECTS OF THE DISCLOSURE

The present application relates to the handling of what are generally referred to as denial of service (DoS) attacks and other forms of attacks upon online resources. More specifically, the present application relates to a method and system for protecting one or more on-line application servers from DoS and/or distributed DoS (DDoS) attacks. As used herein, the term "denial-of-service attack" is defined as computerized assault that seeks to disrupt Web access to an Internet-based resource. It is usually an attempt by an online device or system to make another online machine, system, or network resource unavailable to its intended users, such as to temporarily or indefinitely interrupt or suspend services of a host connected to the Internet. As used herein, the term "distributed denial-of-service attack" is defined as a form of DoS attack that is directed upon a particular target machine or network resource and that originates from multiple, usually coordinated sources. Such an attack sometimes employs thousands of unique source network addresses (e.g., Internet protocol (IP) addresses) to avoid protective measures used by the target.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

The approach described below provides a mechanism that prevents unsolicited access to Internet-facing Web Services, without causing significant performance impact on the Web Service Application Tier. This approach is useful in general to protect Application services from unsolicited requests, and in particular to protect Application services from DoS, DDoS, and similar types of online attacks.

FIG. 1 is a block diagram illustrating the elements of an example network 100, in accordance with various aspects of the present disclosure. The illustration of FIG. 1 shows Web Services Clients 170, 180, 190 connected via respective communication paths 174, 184, 194 to a Web Server 120. The Web Services Clients 170, 180, 190 may be, for example, any suitable communication device equipped with client software that enables communication via its respective communication path 174, 184, 194 such as a desktop, laptop, or handheld computer, a blade server, or any other suitable computer processor based device, including a smart phone. The communication paths 174, 184, 194 of network 100 may be, for example, any suitable wired or wireless communication link capable of communicating digital information such as, for example, a private or public, wired or wireless packet communication link such as the Internet or an intranet, and the communication between the Web Services Clients 170, 180, 190 and the Web Server 120 may use a data communication protocol such as, for example, hypertext markup language (HTTP) carried via a Transmission Control Protocol (TCP) over an IP link (TCP/IP).

The Web Server 120 may be, for example, a computer system having one or more processors running Web server software applications such as the Apache Web Server software application from the Apache Software Foundation, or any other suitable Web Server application. Web Server 120 is communicatively coupled to storage 125, used by the Web Server 120 to store various data including, for example, Client Instance Key 126, a unique identifier of authorized Web Service clients, and Date/Time of Last Request 127, an indication of the date and time of receipt of the most recently received/immediately previous Web Service Request by the client instance identified by the associated Client Instance Key, which are described in further detail below. If Web Server 120 is made up of two or more processors/computers, those two or more processors/computers may be co-located, or may be geographically distributed. A Web Server application may be used to serve Web pages to client applications such as Web browsers (e.g., Chrome® from Google Inc. or Internet Explorer® from Microsoft Corp.), may be used to provide what are referred to herein as "Web services," and/or may be used to provide a communications path to servers that provide "Web services." In some instances, server computers (i.e., servers) that provide Web Services may not communicate Web pages to a client device, but instead may provide any of a wide variety of computing services that may be offered via a network, such as the network 100 of FIG. 1, for example.

The example network 100 shown in FIG. 1 also includes an Application Server, App Server 110, that may function to, among other things, provide Web Services to one or more Web Services Clients such as, for example, the Web Services Clients 170, 180, 190 of FIG. 1. In the example of FIG. 1, the App Server 110 provides Web Services via the Web Server 120 and communication paths 174, 184, 194. As shown in FIG. 1, the App Server 110 is also communicatively coupled to storage 115, used for, among other things, storing one or more Web Service API Keys 116, described in further detail below. The storage 115 may be any form of storage suitable for holding various data and executable code for use by the App Server 110 such as, for example, semiconductor random access memory (RAM), read-only memory (ROM), flash memory, magnetic hard disk memory, and/or optical storage.

As illustrated in FIG. 1, the Web Services Clients 170, 180, 190 may include established Web Services Clients that actively use the Web Services of App Server 110 such as, for example, Web Services Client 170, and may also include new Web Services Clients that have been authorized to, but have not yet made a first Web Services Request such as, for example, new Web Services Client 180. Both the existing and new Web Services Clients 170, 180 seek Web Services that they have been authorized to access. Some Web Services Clients that may attempt to access the App Server 110 may be ill-intentioned such as, for example, Web Services Client 190. Such ill-intentioned or malicious "clients" may not be authorized to access the App Server 110, but may instead be attempting to gain access to information or services for which they are not authorized, or may be attempting to block authorized users of the Web Services Clients 170, 180 from legitimately accessing the App Server 110, using any of a variety of techniques. Each of the Web Services Clients 170, 180, 190 are shown in FIG. 1 as having storage for a respective Client Instance Key 171, 181, 191, a respective Date/Time of Last Request 172, 182, 192, and a respective API Key 173, 183, 193, which are discussed in further detail below.

It should be noted that although the App Server 110 and Web Server 120 are illustrated as separate functional blocks, that aspect of FIG. 1 does not represent a specific limitation of the present disclosure, as the executable code and data used by the App server 110 and the Web Server 120 may function as processes on a single computer having one or more processors, or on a collection of one or more computers each having one or more processors, without departing from the scope of the present disclosure.

Aspects of the present disclosure provide a mechanism for dynamically generating what is referred to herein as an obfuscated Web Service Method Name for use by a Web Server such as, for example, the Web Server 120 of FIG. 1, and trusted client applications such as the Web Service Clients 170, 180, 190 of FIG. 1, to prevent access to an Application Server such as, for example, the App Server 110 of FIG. 1, from general unsolicited sources. The mechanism described herein is particularly useful when the intent is to give access to internet facing Web Services only to authentic clients.

A novel aspect of the present disclosure is the use of what is referred to as a Web Service Request that includes an obfuscated Web Service Method Name. In accordance with various aspects of the present disclosure, the obfuscated Web Service Method Name may, for example, be dynamically generated by a client instance using a random sequence generator and the date and time of the previous invocation of the Web Service by the specific client instance making the Web Service Request. Because the method of obfuscating the Web Service Method Name, and the date and time of the previous invocation of the Web Service by a specific client instance, are known only by the specific client instance that sent the prior Web Service Request and by the Web Server responsible for validation of a received Web Service Request, it is unlikely that those attempting to attack an Application Server that supports the requested Web Service will be successful using manual and/or automated hacking techniques.

In addition, in accordance with aspects of the present disclosure, the detection of an attack upon an application server happens early in the Web Service Request life-cycle, before the attack is able to generate additional load upon the Web Service running in the Application Server. The Applicants have found that a Web Server may be 100+ times more scalable than the downstream Application Server of a similar configuration (i.e., the Web Server can handle 100+ times more in number of requests per second). The throughput and efficacy of the various techniques in the present disclosure will be much higher than any technique implemented on the Application Server that actually hosts the Web Service. This "upstream" detection and filtering of requests significantly reduces any performance degradation that would otherwise affect the Application Server providing the Web Service.

Prior approaches to prevent attacks using malicious Web Service Requests from impacting Application Server performance vary in the technique used and the effectiveness. In one approach, for example, an operator of a Web Service may use a mechanism such as a static Application Program Interface (API) Key, to ensure that the Web Service API is being called only by authentic clients. In this approach, the static API Key is generated one time, is shared with the clients that will use the Web Service, and the validity of the API Key included with the Web Service Request is checked upon receipt of the Web Service request by the Web Service running in the Application Server. Although a different static API Key may be assigned to each type of client, that API Key is subsequently used by all of that type of client of the Web Service. In the case of mobile clients, for example, there may be millions of client instances and all client instances may use the same API Key. Because in this approach the API Key is constant, systems using this approach are vulnerable to DoS/DDoS attacks, and the process of validation of the API Key in each Web Service Request at the Application Server puts additional load on the Application Server.

Another approach that has been used to protect against malicious attacks is the filtering of incoming Web Service Requests based on the IP address of the source of the request. This approach also has limited effectiveness, because the source of the attack may "spoof" or falsify the source IP address in the request, and a large number of different source IP addresses may be used in DDoS attacks.

Yet another approach uses what may be referred to herein as "service filtering," The term "service filtering" may be used herein to describe a situation where an attacker uses a single non-essential service for all attacking packets. For instance, some early DDoS tools used a single User Datagram Protocol (UDP) port for all attacking traffic. In such a case, the attacking traffic can easily be filtered out by filtering on UDP or TCP port or Internet Control Message Protocol (ICMP) message type. However, such forms of attacks are outdated and seldom used in practice today, and if the attack uses unpredictable ports or ports that can't be filtered because they are used for important services, it is not possible to filter on service type.

Finally, it is possible to filter out all traffic to the host or hosts under attack in order to at least protect the rest of the network. This method of attack defense may be referred to herein as "destination address filtering," and is only possible if most attacks are directed at a small number of hosts. If the attack is directed at the entire network or at multiple hosts in the network, filtering on destination address isn't possible. Moreover, legitimate requests to the specific hosts will also get blocked by using this technique.

An approach to protecting Application Server(s) in accordance with aspects of the present disclosure solves the above problems through the use of a novel technique of detecting malicious Web Service Requests early in the request processing cycle, before the request impacts the Web service running on the Application Server.

In general, Web services may be vulnerable to what are referred to herein as DoS and DDoS attacks, among other forms of malicious activity. In initiating an attack, the originator of the attack may, for example, request Web services using either an incorrect or a correct API Key. The originator of the attack need only know the Universal Resource Locator (URL) of the Application Server providing Web Services in order to mount the attack. With the URL information, a malicious source that does not know a valid API Key may simply flood the Application Server with a large number of requests for Web services, where each Web Service Request contains an invalid API Key. Because the API Key in each Web Service Request must be validated at the application tier before the Web Service Application Server accepts and responds to the Web Service Request, these types of Web Service Requests will be invalidated very late in the flow of Web Service Requests, and the validation of malicious Web Service Requests will increase the load on the entire path to and including the Application Server. If, however, the attacker knows the correct API Key, the situation may be even worse, and access to a valid API Key could be shared among huge numbers of client instances. An attacker in possession of a valid API Key may flood the Application Server with Web Service Requests, each having a valid API Key for the requested Web Service, and the Web Services Server will therefore be unable to determine from the API Key that the service request is not valid. In that instance, the load on the path to and including the Application Server increases due to the process of evaluating Web Service Requests from what the Application Server believes are valid clients. The received Web Service Requests, however, must be evaluated as though the requests are valid, and the Application Server spends a large amount of time processing the Web Service Requests of the attacker, impacting its ability to process Web Service Requests from valid clients.

From the above discussion it is clear that an important aspect to protection of the Web Service Application Server is the use of a dynamic API Key, so that the API Key cannot be duplicated and used by unauthorized clients. In addition, it is important to detect a possible attack as early as possible in the life-cycle of a Web Service Request, before processing of the Web Service Request imparts load upon the Web Service running on an Application Server such as, for example, the Application Server 110.

Thus, an important feature of a solution for protecting Web Services Application Servers against DoS/DDoS attacks in accordance with various aspects of the present disclosure is to introduce dynamic aspects in the request-response flow that cannot be easily simulated by illegitimate clients.

The following discussion describes a mechanism in accordance with various aspects of the present invention that may be used to authenticate a client of a Web Service based on a dynamically generated token used to change or "obfuscate" the name of the Web Service being requested. The obfuscation makes the Web Service Request appear to be a random Web Service invocation and hence, difficult to be understood or to be correctly produced by attackers. In accordance with aspects of the present disclosure, unauthorized invocations of the Web Service may be intercepted and quickly filtered out by a Web Server such as, for example, the Web server 120 of FIG. 1, which performs initial processing so that only authorized Web Service Requests are propagated to an Application Server such as, for example, the App Server 110 of FIG. 1 that supports the requested Web Service. In this way, illegitimate clients may instead receive no response or, for example, a "HTTP 404" error issued by an Internet-facing Web Server, such as the Web Server 120 of FIG. 1.

In accordance with various aspects of the present disclosure, what may be referred to herein as a "Client Instance Key' may be used that is generated by each client instance/installation. A particular value of the "Client Instance Key' may be generated at the client such as, for example, a value comprising eight decimal or hexadecimal digits in length, by any method of choice that has a high probability of being unique (e.g., a random/pseudorandom number generator algorithm or a number derived from the media access control (MAC), or physical address or Universal Unique Identifier (UUID) of the device) may be used, at the time of first initialization of each client instance (e.g., client server, mobile application), and may be passed as a parameter every time a Web Service Request is sent by a client instance to an Application Server protected as described herein. In a rare case where the Client Instance Key chosen or generated is not unique (has a duplicate detected), an attempt of a Web Service to register the client instance will fail, and the client may then retry with another attempted unique Client Instance Key. In accordance with aspects of the present disclosure, the "Client Instance Key" for every client instance may remain constant over time, following initialization of the client instance.

In addition, in accordance with various aspects of the present disclosure, what may be referred to herein as a "Dynamic Auth Key" (i.e., Dynamic Authentication Key) may be used in the method of obfuscation of the Web Service Method Name, mentioned above. A Dynamic Auth Key according to aspects of the present disclosure is a random number (e.g., of a particular length not exceeding 16 decimal or hexadecimal digits) that may be appended to/made a part of the Web Service Method Name portion of the Web Service Request sent to the Application Server by the client instance. In accordance with aspects of the present disclosure, the Dynamic Auth Key may, for example, be generated based on the date and time in, for example, Coordinated Universal Time (UTC) expressed as minute:hour:date:month:year of the previous invocation (i.e., Web Service Request or API call) of a Web Service Method by the client instance. Upon receipt by the Web Server, it may be paired with the corresponding Client Instance Key. In accordance with various aspects of the present disclosure, the Dynamic Auth Key may be generated based on other information as well such as, for example, the number of Web Service Requests (e.g., API calls) sent by the client instance during a certain prior period of time (e.g., the last hour, day, or other suitable window of time), the geographic location (e.g., GPS coordinates) of the client), or any combination of the above.

For example, a Web Service Method Name of "getProduct" may be modified according to aspects of the present disclosure so that it becomes "getProductXXXX", where the portion "XXXX" is the value of the Dynamic Auth Key generated in accordance with the present disclosure. For example, in an example where the "getProduct" API has a signature of "http://api.developer.xyzcorp.com/v3/productDetail/getProduct/{partNumber}", the new interface, according to aspects of the present disclosure may be: "http://api.developer.xyzcorp.com/v3/productDetail/getProduct<DynamicAuthKey>/{partNumber}?ClientInstanceKey=XXXXXXXX". If, for example, the previous invocation of the API by a client instance was on 1 Jan. 2016 at 10:00 AM, the corresponding Dynamic Auth Key may be "2296982992703198933". If the Client Instance Key value is "87654321", the next API invocation by this client may look be "http://api.developer.xyzcorp.com/v3/productDetail/getProduct2296982992703198933/{partNumber}?ClientInstanceKey=87654321". That is, the "getProduct" API name may be obfuscated to "getProduct2296982992703198933". If the Web Service Request to be sent by the client is the first Web Service Request ever sent by the client, the date and time value used in the generation of the Dynamic Auth Key used for obfuscation of the Web Service Method may be a specified default value such as, for example, "00:12:01:01:1980".

In accordance with aspects of the present disclosure, a Web Server such as the example Web Server 120 of FIG. 1 may maintain for each particular client instance from which it has received a Web Service Request (e.g., Web Service Client 170 of FIG. 1), a copy of the Client Instance Key (e.g., Client Instance Key 126) sent with the Web Service Request and a corresponding previous (i.e., last or most recently received) Web Service Method invocation date and time (e.g., Date/Time of Last Request 127), for use in validating the Dynamic Auth Key appended by that particular client instance to the Web Service Method Name in the next Web Service Request received by Web Server 120 from the particular client instance. Using this stored information for each authorized client, a Web Server according to the present disclosure (e.g., Web Server 120) is able to validate the authenticity of the client instance submitting the Web Service Request (e.g., the Web Service API caller).

Figure 2:
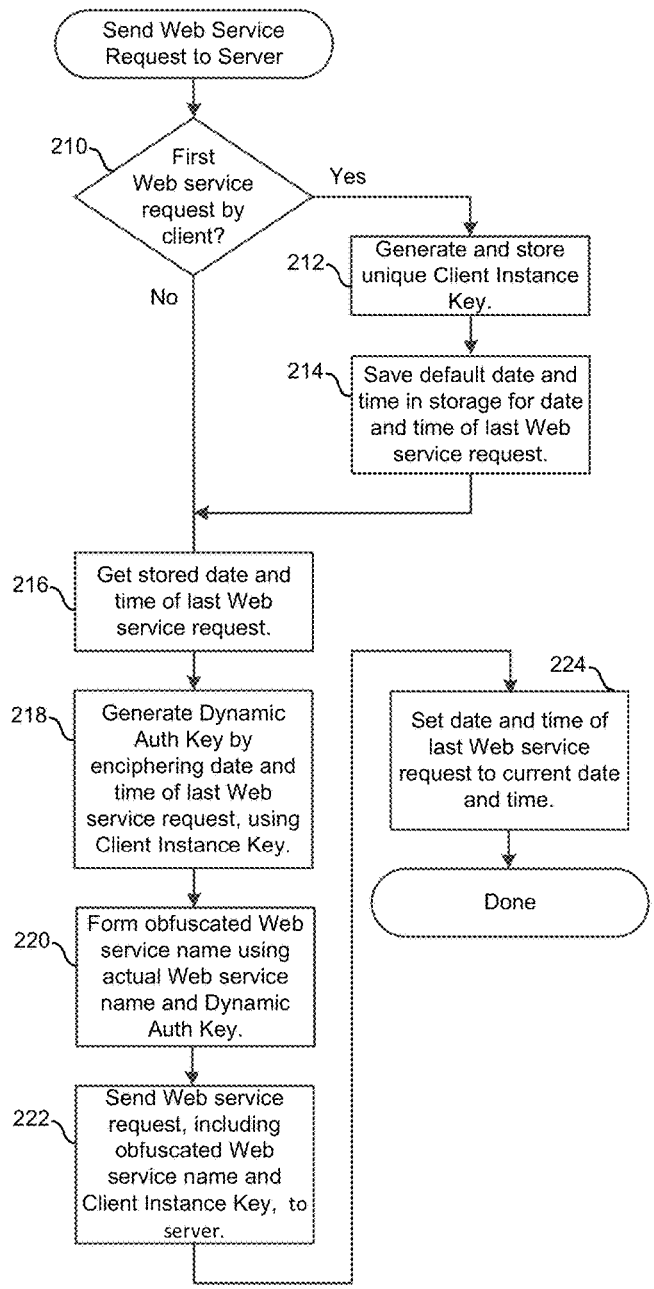
FIG. 2 is a flowchart illustrating an example method of enabling a client instance to request a Web Service from a Web Services Application Server such as the App Server of FIG. 1, in accordance with various aspects of the present disclosure.

FIG. 2 is a flowchart 200 illustrating an example method of enabling a client instance to request a Web Service from a Web Services Application Server such as the App Server 110 of FIG. 1, in accordance with various aspects of the present disclosure. The following discussion of FIG. 2 makes reference to various elements of the example network 100 of FIG. 1 discussed above. The example method of FIG. 2 begins at decision block 210, where a client instance such as, for example, one of the Web Services Clients 170, 180, 190 has decided to issue a Web Service Request to an Application Server such as the App Server 110, of FIG. 1, and makes a determination as to whether the current Web Service Request is the first Web Service Request to originate from this client instance. If it is determined that this is not the first Web Service Request of this client instance (e.g., for established Web Service Client 170), it is known that the client instance (e.g., Web Service Client 170) already has a saved Client Instance Key and a Date/Time of Last Request, and the method then proceeds to block 216, described below. If, however, it is determined that this is the first Web Service Request for this client instance (e.g., for new Web Service Client 180), the method proceeds to block 212, where the client instance generates and stores a unique Client Instance Key in memory (e.g., Client Instance Key 171). Next, because this is the first Web Service Request issued by this client instance, no previous date and time of a previous Web Service Requests exists, and the method of FIG. 1 directs the client instance to store a specific default date and time value in storage as the date and time of the last/previous Web Service Request (e.g., the Date/Time of Last Request 172). The method then proceeds to block 216, described below.

At block 216, the method of FIG. 2 retrieves the stored date and time of the last Web Service Request from memory of the client instance (e.g., Date/Time of Last Request 172, 182 for Web Services Clients 170, 180, respectively) and at block 218, generates a Dynamic Auth Key for the current Web Service Request by enciphering the retrieved date and time of the last Web Service Request (e.g., Date/Time of Last Request 172, 182 for Web Services Clients 170, 180, respectively) using the respective Client Instance Key (e.g., Client Instance Keys 171, 181, respectively).

Next, at block 220, the method directs the client instance to form an obfuscated Web Service Method Name by adding the generated Dynamic Auth Key to the actual method name of the Web Service needed by the client instance. As earlier described by an example discussed above, a client instance such as example Web Service Clients 170, 180 may wish to invoke a "getProduct" Web Service on the App Server 110 of FIG. 1, and may generate a Dynamic Auth Key of "XXXX" using the process just described. The client instance may then, for example, form an obfuscated Web Service Method Name by appending the Dynamic Auth Key ("XXXX") to the actual Web Service Method Name ("getProduct"), resulting in the desired obfuscated Web Service Method Name ("getProductXXXX"). The method of FIG. 1 then proceeds to block 222.

At block 222, the method directs the client instance to send the Web Service Request with the obfuscated Web Service Method Name to the Application Server that provides the desired Web Service. In accordance with aspects of the present disclosure, the client instance (e.g., one of Web Service Clients 170, 180) has been provided with the IP address of the Web Server 120 of FIG. 1 as the destination address for the current Web Service Request, and the Web Service Request, including the obfuscated Web Service Method Name and the Client Instance Key of the client instance (e.g., one of Web Service Clients 170, 180) is sent to the Web Server 120. The method of FIG. 2 then, at block 224, directs the client instance to set the date and time at which the Web Service Request was transmitted to the Web Server 120 (e.g., Date/Time of Last Request 172, 182) to the current date and time. The method of FIG. 2 is then finished for the current Web Service Request.

Figure 3A:
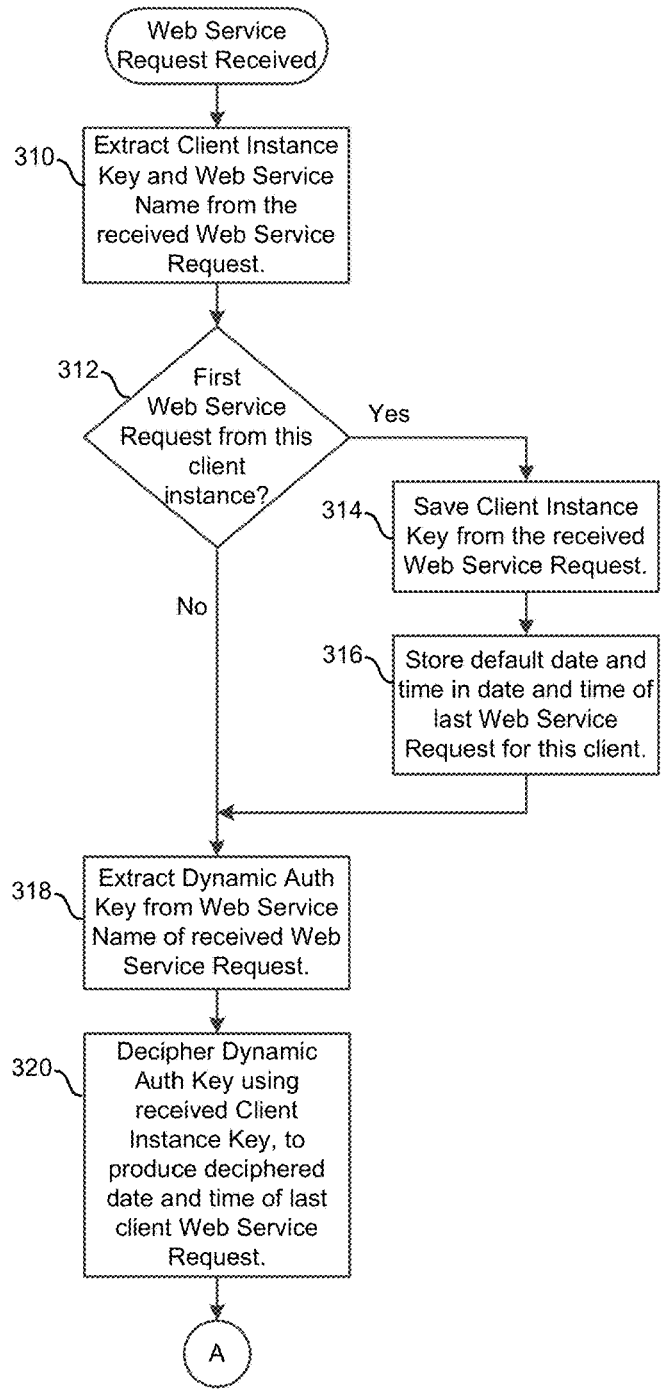
FIGS. 3A-3B are a flowchart illustrating an example method of operating a Web Server such as the Web Server of FIG. 1, in accordance with various aspects of the present disclosure.
Figure 3B:
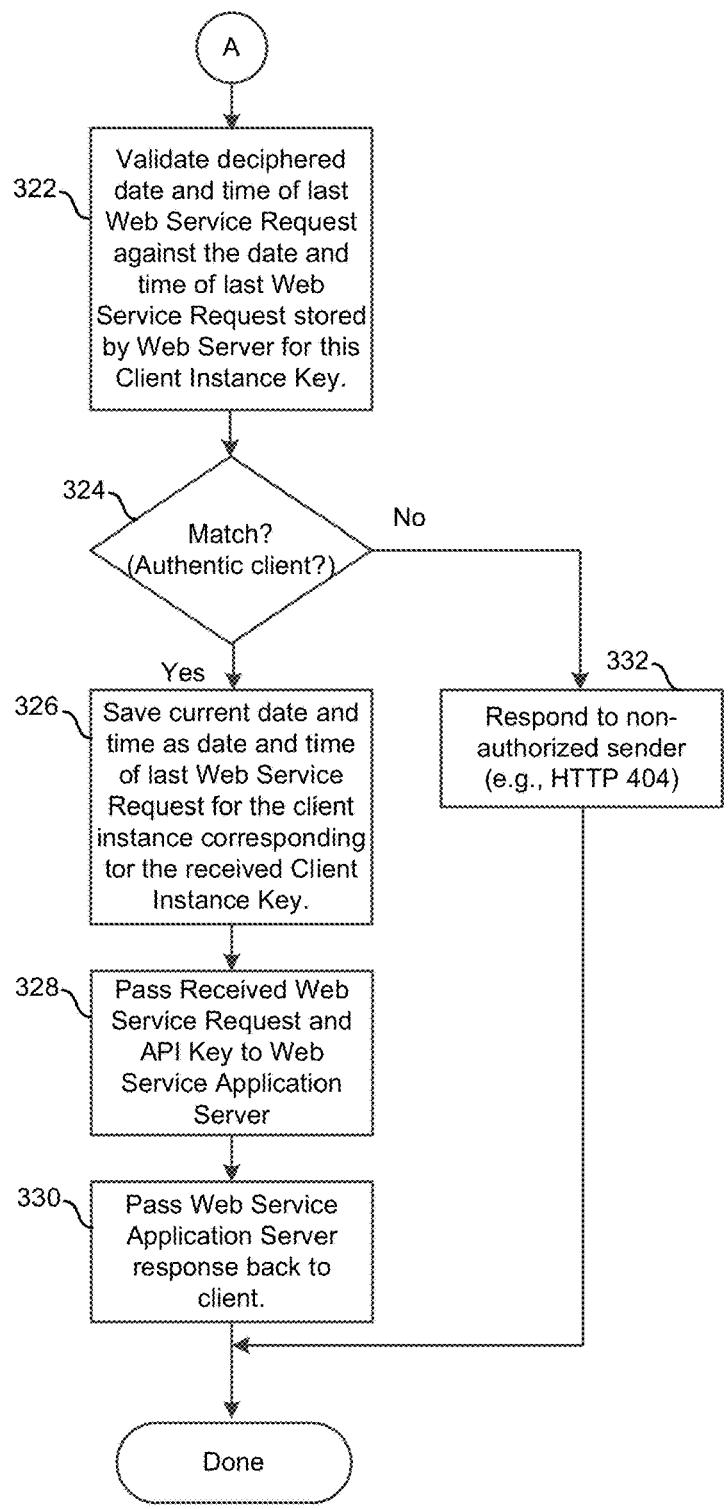

FIGS. 3A-3B show a flowchart 300 illustrating an example method of operating a Web Server such as the Web Server 120 of FIG. 1, in accordance with various aspects of the present disclosure. The following discussion of FIGS. 3A-3B makes reference to the elements of the example network 100 of FIG. 1, discussed above. The example method of FIGS. 3A-3B begins at decision block 310, where a Web Server performing the method of FIGS. 3A-3B (e.g., Web Server 120) has received a Web Service Request for a Web Service provided by an Application Server which the Web Server 120 protects (e.g., App Server 110), in accordance with aspects of the present disclosure. At block 310, the Web Server (e.g., Web Server 120) extracts the Web Service Method Name and Client Instance Key from the Web Service Request just received from a client instance (e.g., one of Web Service Clients 170, 180, 190). The method of FIGS. 3A-3B then, at block 312, determines whether the received Web Service Request is the first Web Service Request ever received from the client instance that corresponds to the received Client Instance Key. It may make such a determination by, for example, checking a stored collection of Client Instance Keys received as part of Web Service Requests previously received and processed such as, the Client Instance Keys 162, 128 stored in storage 125. If the Web Server determines that the client instance identified by the Client Instant Key has previously made a Web Service Request to the Web server, the method of FIGS. 3A-3B continues at block 318, described below. If, however, the Web Server (e.g., Web Server 120) has no record of receiving a previous Web Service Request from the client instance corresponding to the received Client Instant Key, the method directs the Web Server to continue at block 314, where the method saves the received Client Instance Key in storage (e.g., Client Instance Key 126). Then, at block 316, the method may direct the Web Server to store a specified default date and time (e.g., as described above) as the date and time of the last Web Service Request for this client instance (e.g., Date/Time of Last Request 127), and the method proceeds to block 318.

At block 318, the Web Server performing the method of FIGS. 3A-3B extracts the Dynamic Auth Key portion from the obfuscated Web Service Method Name in the received Web Service Request and, at block 320, deciphers the extracted Dynamic Auth Key portion, using the Client Instance Key in the received Web Service Request, to produce the date and time of the last Web Service Request as submitted by the client instance that sent the Web Service Request currently being processed. Next, at block 322, the Web Server (e.g., Web Server 120) validates/compares its own record of the date and time of receipt of the previous Web Service Request from the particular client instance of the Web Service Request currently being processed (e.g., Date/Time of Last Request 127), to the date and time sent by that particular client instance in, and deciphered by the Web Server from the Dynamic Auth Key portion of the obfuscated Web Service Method Name.

Next, at block 324, the method of FIGS. 3A-3B determines whether the date and time of receipt of the previous received Web Service Request stored by the Web Server (e.g., Date/Time of Last Request 127) matches the date and time of the sending of the previous Web Service Request to the Web Server, as submitted by the client instance in the Dynamic Auth Key in Web Service Request currently being processed by the Web Server. If the dates and times of the previous Web Service Request of the client instance as saved at the Web server and at the client instance do match, the method then, at block 326, saves the current date and time as the date and time of the Web Service Request last received by the Web Server. The method then, at block 328, causes the Web Server to pass a Web Service Request with the actual Web Service Method Name and the corresponding API Key received from the client instance to the Web Service Application Server (e.g., App Server 110). Any response received by the Web Server from the Web Services Application Server is then passed back to the client instance, at block 330.

If, however, the dates and times of the previous Web Service Request of the client instance as saved by the Web server and the client instance do not match, the method then, at block 332, sends an appropriate response to what appears to be a non-authorized or malicious client instance (e.g., Web Services Client 190), and ends processing of the received Web Service Request. Such a non-authentic client instance may have acquired a valid API Key (e.g., API Key 193) through some means, but will with high probability not be able to acquire details of the need to send, let alone the process of generating a Client Instance Key (e.g., Client Instance Key (?) 191), and similarly will not know the need for or the details of the algorithms used to produce the Dynamic Auth Key used to correctly obfuscate a valid Web Service Method Name. Therefore, unauthorized clients attempting to access a Web Services Application Server (e.g., App Server 110) of a network according to aspects of the present disclosure, whether malicious or simply accessing an incorrect URL, will be blocked by an intervening Web Server (e.g., Web Server 120) from successfully accessing the Web Services Application Server (e.g., App Server 110), in accordance with aspects of the present disclosure. Thus the network architecture of FIG. 1 and the methods illustrated in the flowcharts of FIGS. 2, 3A, and 3B provide protection to a Web Service Application Server from DoS and DDoS attacks, as well as other forms of malicious behavior.

It should be noted that in accordance with various aspects of the present disclosure, allowances for lack of synchronization of the time-of-day clocks at the Web Services Client and the Web Server need not be made, and would not typically be required. Most such systems (i.e., client devices as well as servers) use the Network Time Protocol (NTP). NTP is intended to synchronize all participating systems to within a few milliseconds of UTC. NTP is designed to mitigate the effects of variable network latency. The Dynamic Auth Key algorithm in accordance with aspects of the present disclosure may, for example, use time-of-day having a granularity of a minute, in that accuracy of seconds and better level is typically not needed, so this mitigates any network latency issues.

Figure 4:
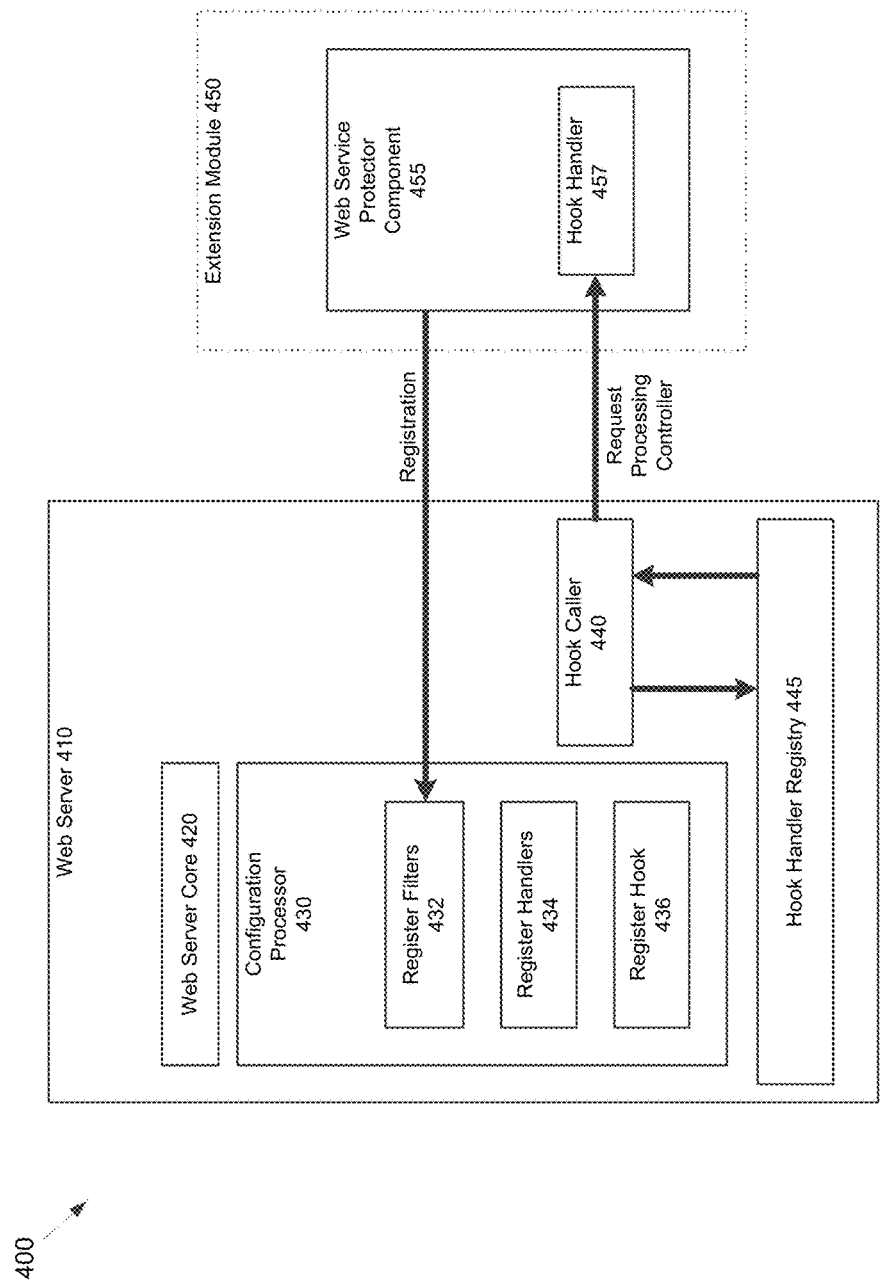
FIG. 4 is a block diagram illustrating an example architecture for extending a Web Server using an Extension Module comprising a Web Service Protector Component, in accordance with various aspects of the present invention.

FIG. 4 is a block diagram illustrating an example architecture for extending a Web Server 410 using an Extension Module 450 comprising a Web Service Protector Component 455, in accordance with various aspects of the present invention. The functionality provided by the Web Server 410 comprises a Web Server Core 420, a Configuration Processor 430, a Hook Handler Registry 445, and a Hook Caller 440. The Extension Module 450 comprises a Web Service Protector Component 455, which includes a Hook Handler 457. As shown in the example of FIG. 4, the Web Server 410 uses the Web Service Protector Component 455 of the Extension Module 450 to pre-process Web Service Requests for validity before the Web Service Request is propagated to a Web Service Application Server, such as the Web Service Application Server 110 of FIG. 1.

The Web Server 410 may be, for example, the Apache HTTP Server from the Apache Foundation, previously mentioned above, but many other suitable Web Server applications exist that have an extension mechanism similar to that of Apache HTTP Server. Such functionality of Apache HTTP Server is identified herein as "Hook Caller" and "Hook Handler" functionality, which may be used to support the protection mechanism of the present disclosure.

The solution presented here is illustrated using Apache HTTP server, which allows the registration of an executable code module to enable code in the module to be called at certain points in the processing of a received client request. At startup of the Web Server 410 in the architecture shown in FIG. 4, the existence of the Extension Module 450 may be detected, and the functionality of the Hook Handler 457 of the Web Service Protector Component 455 may be registered with the Web Server 410. This registration permits the Web Server 410 to establish any necessary configuration information in the Register Filters 432, Register Handlers 434, and Register Hook 436 information of the Configuration Processor 430 of the Web Server 410. The registration of the Extension Module 450 also causes the update of the Hook Handler Registry 445, enabling the communication between the Hook Caller 440 of the Web Server 410, and the Hook Handler 457 of the Web Service Protector Component 455 of the Extension Module 450. In this manner, as each Web Services Request is received by the Web Server 410 from a Web Service client instance such as, for example, the Web Service Clients 170, 180, 190, the Hook Caller 440 of the Web Server 410 then causes the execution of the code of the Hook Handler 457 of the Web Service Protector Component 455. The Hook Handler 457 and Web Services Protector Component 455 together cause the Web Server 410 and Extension Module 450 to perform the method of FIGS. 3A-3B for the processing of Web Service Requests, in accordance with various aspects of the present disclosure.

Figure 5:
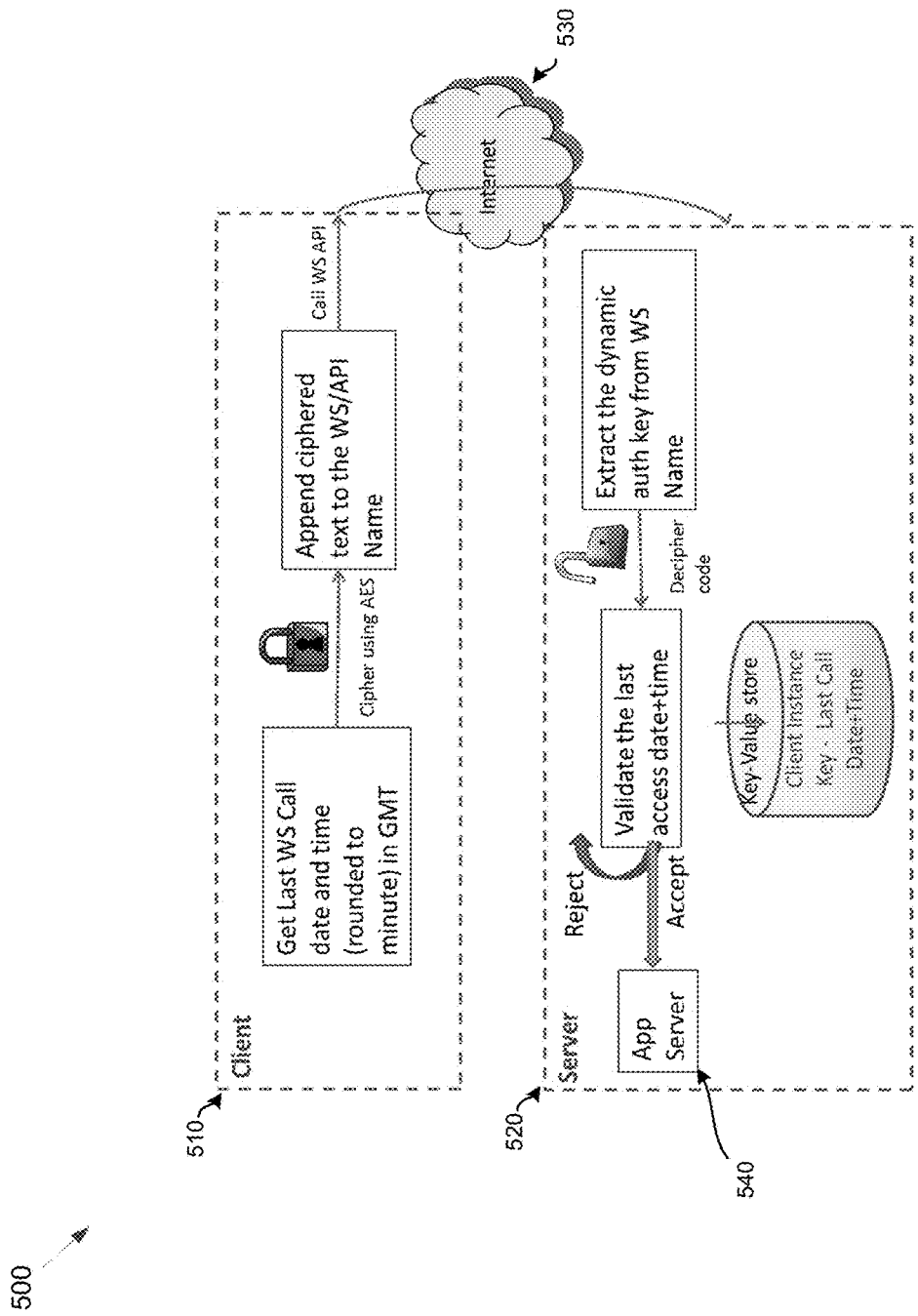
FIG. 5 is a high-level block diagram illustrating the method of protecting a Web Service interface from various forms of attack as described in detail with regards to FIGS. 1, 2, 3A, 3B, and 4, above, in accordance with various aspects of the present disclosure.

FIG. 5 is a high-level block diagram illustrating the method of protecting a Web Service interface from various forms of attack as described in detail with regards to FIGS. 1, 2, 3A-3B, and 4, above, in accordance with various aspects of the present disclosure. The illustration of FIG. 5 shows a Web Service Client 510 and Web Server 520 communicatively coupled via a communications network 530 such as, for example, the Internet. The Web Service Client 510 and the Web Server 520 may correspond, for example, to the Web Service Client 170 and Web Server 120 of FIG. 1. As shown in FIG. 5, the Web Service Client 510 enciphers/encrypts the date and time of the last/previous Web Service Request (e.g., API call) by the client 510 using, for example, encryption according to the Advanced Encryption Standard (AES), or any other suitable encryption algorithm. As described above, the Web Service Client 510 may perform the encryption using, for example, a unique identifier of the Web Service Client 510 such as, for example, a Client Instance Key such as that described above with respect to FIGS. 1, 2, 3A, 3B and 4. The Web Service Client 510 then obfuscates the name of the Web Service to be requested, by appending the enciphered date and time of the last Web Service Request made by the Web Service Client 510 to the actual Web Service Name of the desired Web Service as known by the Web Service Application Server 540. The Web Service Client 510 then sends a Web Service Request including, for example, the obfuscated Web Service Name, an API Key for the Web Service, and other information (e.g., the Client Instance Key), to the Web Server 520, via the Internet 530.

Upon receipt of the Web Service Request, the Web Server 520 extracts the portion of the obfuscated Web Service Name that contains the enciphered/encrypted date and time of the last Web Service Request by the Web Service Client 510, decrypts that portion to produce the date and time of the last Web Service Request as recorded by the Web Service Client 510, and validates that date and time against date and time information stored at the time of receipt by the Web Server 520 of the last Web Service Request, which is maintained in storage by the Web Server 520. If the decrypted date and time matches the date and time maintained by the Web Server 520, the Web Service Request is accepted and a second Web Service Request, with the Web Service Name and API Key, is sent on to the Web Service Application Server 540. If a match does not occur, the Web Server 520 may discard the Web Service Request with or without a response to the Web Service Client 510.

Aspects of the present disclosure may be seem in a method for operating a system that uses a dynamically generated web services interface to protect a processor of service requests from attacks received via a data communication network. Such a method may comprise receiving a first service request, by a first processor from a client system via the data communication network, where the first service request comprises an identifier of the client system, a service identifier, and a service key; and producing, by the first processor, a client date and time by deciphering a portion of the service identifier using the identifier of the client system. The method may also comprise determining, by the first processor, whether the first service request is an initial service request received by the first processor from the client system. The method may further comprise identifying, by the first processor, a first match of the client date and time with a default date and time, if it is determined that the first service request is the initial service request received from the client system; and identifying, by the first processor, a second match of the client date and time with a date and time of receipt of a previous service request received from the client system, if it is determined that the first service request is not the initial service request received from the client system. The method may also comprise sending a second service request, by the first processor to the second processor, if either the first match or the second match is identified, wherein the second service request comprises a service name portion and the service key; and forwarding, by the first processor to the client system, a response of the second server processor to the second service request.

In accordance with various aspects of the present disclosure, the service identifier may comprise a service name portion and a dynamic key portion, and the service name portion may identify a service to be performed for the client system by the second processor. Deciphering a portion of the service identifier may comprise deciphering the dynamic key portion of the service identifier using the identifier of the client system to produce the client date and time, and the particular date and time may be the default date and time, if a service request sent by the client system is the initial service request sent to the first processor. In accordance with some aspects of the present disclosure, the service identifier may not be a valid service name portion accepted by the second processor.

In accordance with aspects of the present disclosure, the method may also comprise sending an error indication, by the first processor to the client system, if both the first match and the second match are not identified. The method may also comprise discarding the first service request, by the first processor, if both the first match and the second match are not identified. Sending a second service request may comprise placing in storage coupled to the first processor, a date and time of receipt of the first service request, in association with the identifier of the client system. In addition, the first processor may comprise a Web Server Application running on one or more computers; and the second processor may comprise a Web Services Application running on the one or more computers.

Additional aspects of the present disclosure may be found in a non-transitory computer readable medium having a plurality of code sections. Each code section may comprise a plurality of instructions executable by one or more processors to cause the one or more processors to perform steps of a first process that uses a dynamically generated web services interface to protect a second process from attacks received via a data communication network. The steps of such a process may comprise receiving a first service request, from a client system via the data communication network. The first service request may comprise an identifier of the client system, a service identifier, and a service key. The steps may also comprise producing a client date and time by deciphering a portion of the service identifier using the identifier of the client system; and determining whether the first service request is an initial service request received by the first processor from the client system. The steps may further comprise identifying a first match of the client date and time with a default date and time, if it is determined that the first service request is the initial service request received from the client system; and identifying a second match of the client date and time with a date and time of receipt of a previous service request received from the client system, if it is determined that the first service request is not the initial service request received from the client system. The process may also send a second service request to the second processor, if either the first match or the second match is identified, wherein the second service request comprises a service name portion and the service key; and forward the client system, a response of the second server processor to the second service request.

In accordance with the present disclosure, the service identifier may comprise a service name portion and a dynamic key portion, and the service name portion may identify a service to be performed for the client system by the second process. Deciphering a portion of the service identifier may comprise deciphering the dynamic key portion of the service identifier using the identifier of the client system to produce the client date and time, and the particular date and time may be the default date and time, if a service request sent by the client system is the initial service request sent to the first process. Further, the service identifier may not be a valid service name portion accepted by the second process.

The process may comprise sending an error indication to the client system, if both the first match and the second match are not identified; and discarding the first service request, if both the first match and the second match are not identified. Sending a second service request may comprise placing in storage accessible to the first process, a date and time of receipt of the first service request, in association with the identifier of the client system. In accordance with various aspects of the present disclosure, the first process may comprise a Web Server Application running on one or more computers; and the second process may comprise a Web Services Application running on the one or more computers.

Further aspects of the present disclosure may be observed in a system that uses a dynamically generated web services interface to protect a second system for processing service requests from attacks received via a data communication network. Such a system may comprise one or more processors communicatively coupled to the data communication network and to the second system, where the one or more processors may be operable to, at least receive a first service request from a client system via the data communication network. The first service request may comprise an identifier of the client system, a service identifier, and a service key.

The one or more processors may also be operable to produce a client date and time by deciphering a portion of the service identifier using the identifier of the client system; and determine whether the first service request is an initial service request received by the first processor from the client system. The one or more processors of the system may also be operable to identify a first match of the client date and time with a default date and time, if it is determined that the first service request is the initial service request received from the client system; and to identify a second match of the client date and time with a date and time of receipt of a previous service request received from the client system, if it is determined that the first service request is not the initial service request received from the client system. The one or more processors may also send a second service request to the second system, if either the first match or the second match is identified, wherein the second service request comprises a service name portion and the service key; and forward to the client system, a response of the second system to the second service request.

In accordance with various aspects of the present disclosure, the service identifier may comprise a service name portion and a dynamic key portion, and the service name portion may identify a service to be performed for the client system by the second system. Deciphering a portion of the service identifier may comprise deciphering the dynamic key portion of the service identifier using the identifier of the client system to produce the client date and time. The particular date and time may be the default date and time, if a service request sent by the client system is the initial service request sent to the system, and the service identifier may not be a valid service name portion accepted by the second system. The one or more processors may be further operable to send an error indication to the client system, if both the first match and the second match are not identified; and to discard the first service request, if both the first match and the second match are not identified. Sending a second service request may comprise placing in storage coupled to the system, a date and time of receipt of the first service request, in association with the identifier of the client system. The system may comprise a Web Server Application running on one or more computers; and the second system may comprise a Web Services Application running on the one or more computers.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of this disclosure and appended diagrams.

Accordingly, various aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Various aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various aspects of the present disclosure have been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for operating a system that uses a dynamically generated web services interface to protect a processor of service requests from attacks received via a data communication network, the method comprising:
   receiving, by web server circuitry, a first service request from a client system via the data communication network, wherein the first service request comprises an identifier of the client system, a service identifier, and a service key;
   producing, by web service protection circuitry coupled to the web server circuitry, a client date and time by deciphering a portion of the service identifier using the identifier of the client system;
   determining, by the web service protection circuitry, whether the first service request is an initial service request received by the web server circuitry from the client system;
   if it is determined that the first service request is the initial service request received from the client system, identifying, by the web service protection circuitry, the client system as an authorized client system if the produced client date and time matches a default date and time;
   if it is determined that the first service request is not the initial service request received from the client system, identifying, by the web service protection circuitry, the client system as an authorized client system if the produced client date and time matches a stored date and time corresponding to receipt of a previous service request received from the client system; and
   if the client is identified as an authorized client system:
      sending a second service request, by the web server circuitry to application server circuitry, wherein the second service request comprises a service name portion and the service key; and
      forwarding, by the web server circuitry to the client system, a response of the application server circuitry to the second service request.

2. The method according to claim 1, wherein the service identifier comprises a service name portion and a dynamic key portion.

3. The method according to claim 2, wherein the service name portion identifies a service to be performed for the client system by the application server circuitry.

4. The method according to claim 2, wherein deciphering a portion of the service identifier comprises deciphering the dynamic key portion of the service identifier using the identifier of the client system to produce the client date and time.

5. The method according to claim 1, wherein the service identifier is not a valid service name portion accepted by the application server circuitry.

6. The method according to claim 1, further comprising:
sending an error indication, by the web server circuitry to the client system, if the client system is not identified as an authorized client system.

7. The method according to claim 1, further comprising:
discarding the first service request, by the web server circuitry, if the client system is not identified as an authorized client system.

8. The method according to claim 1, wherein sending the second service request comprises:
placing in storage coupled to the web server circuitry, the date and time corresponding to receipt of the first service request from the client system, in association with the identifier of the client system.

9. A non-transitory computer readable medium having a plurality of code sections, each code section comprising a plurality of instructions executable by web server circuitry to cause the web server circuitry to perform a method comprising:
receiving, by web server circuitry, a first service request from a client system via the data communication network, wherein the first service request comprises an identifier of the client system, a service identifier, and a service key;
producing, by web service protection circuitry coupled to the web server circuitry, a client date and time by deciphering a portion of the service identifier using the identifier of the client system;
determining, by the web service protection circuitry, whether the first service request is an initial service request received by the web server circuitry from the client system;
if it is determined that the first service request is the initial service request received from the client system, identifying, by the web service protection circuitry, the client system as an authorized client system if the produced client date and time matches a default date and time;
if it is determined that the first service request is not the initial service request received from the client system, identifying, by the web service protection circuitry, the client system as an authorized client system if the produced client date and time matches a stored date and time corresponding to receipt of a previous service request received from the client system; and
if the client is identified as an authorized client system:
sending a second service request, by the web server circuitry to application server circuitry, wherein the second service request comprises a service name portion and the service key; and
forwarding, by the web server circuitry to the client system, a response of the application server circuitry to the second service request.

10. The non-transitory computer readable medium according to claim 9, wherein the service identifier comprises a service name portion and a dynamic key portion.

11. The non-transitory computer readable medium according to claim 10, wherein the service name portion identifies a service to be performed for the client system by the application server circuitry.

12. The non-transitory computer readable medium according to claim 10, wherein deciphering a portion of the service identifier comprises deciphering the dynamic key portion of the service identifier using the identifier of the client system to produce the client date and time.

13. The non-transitory computer readable medium according to claim 9, wherein the service identifier is not a valid service name portion accepted by the application server circuitry.

14. The non-transitory computer readable medium according to claim 9, further comprising:
sending an error indication, by the web server circuitry to the client system, if the client system is not identified as an authorized client system.

15. The non-transitory computer readable medium according to claim 9, further comprising:
discarding the first service request, by the web server circuitry, if the client system is not identified as an authorized client system.

16. The non-transitory computer readable medium according to claim 9, wherein sending the second service request comprises:
placing in storage coupled to the web server circuitry, the date and time corresponding to receipt of the first service request from the client system, in association with the identifier of the client system.

17. A system that uses a dynamically generated web services interface to protect a second system for processing service requests from attacks received via a data communication network, the system comprising:
web server circuitry and web service protection circuitry, wherein:
the web server circuitry is operable to receive a first service request from a client system via the data communication network;
the first service request comprises an identifier of the client system, a service identifier, and a service key;
the web service protection circuitry is operable to produce a client date and time by deciphering a portion of the service identifier using the identifier of the client system;
the web service protection circuitry is operable to determine whether the first service request is an initial service request received by the web service circuitry from the client system;
the web service protection circuitry is operable to, if it is determined that the first service request is the initial service request received from the client system identify the client system as an authorized client system if the produced client date and time matches a default date and time;
the web service protection circuitry is operable to, if it is determined that the first service request is not the initial service request received from the client system, identify the client system as an authorized client system if the produced client date and time matches a stored date and time corresponding to receipt of a previous service request received from the client system;
the web server circuitry is operable to, if the client is identified as an authorized client system:
send a second service request to the application server circuitry, wherein the second service request comprises a service name portion and the service key; and forward to the client system, a response of the application server circuitry to the second service request.

18. The system according to claim 17, wherein the service identifier comprises a service name portion and a dynamic key portion.

19. The system according to claim 18, wherein the service name portion identifies a service to be performed for the client system by the application server circuitry.

20. The system according to claim 18, wherein deciphering a portion of the service identifier comprises deciphering the dynamic key portion of the service identifier using the identifier of the client system to produce the client date and time.

21. The system according to claim 17, wherein the service identifier is not a valid service name portion accepted by the application server circuitry.

22. The system according to claim 17, wherein the web server circuitry is further operable to:
  send an error indication to the client system, if the client system is not identified as an authorized client system.

23. The system according to claim 17, wherein the web server circuitry is further operable to:
  discard the first service request, if the client system is not identified as an authorized client system.

24. The system according to claim 17, wherein the send of the second service request comprises:
  placement in storage coupled to the web server circuitry, the date and time corresponding to receipt of the first service request from the client system, in association with the identifier of the client system.

* * * * *